Figure 1:
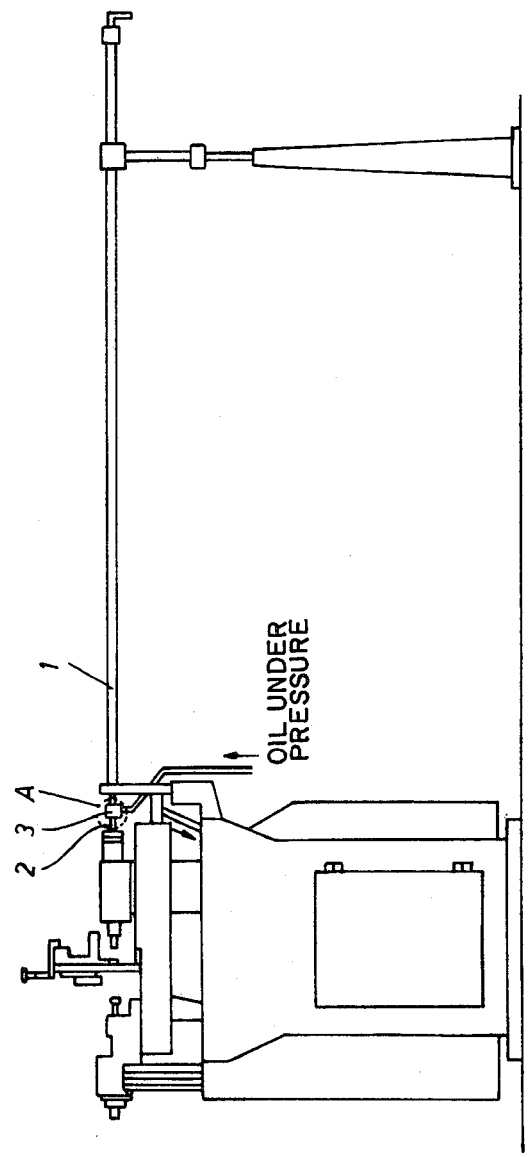

United States Patent [19]

Neukomm, deceased

[11] 4,365,529
[45] Dec. 28, 1982

[54] HYDRODYNAMIC INJECTION DEVICE FOR MACHINE TOOLS

[75] Inventor: Walter Neukomm, deceased, late of Court, Switzerland, by Marguerite Neukomm, heiress

[73] Assignee: Societe de Vente et de Fabrication pour le Decolletage LNS S.A., Berne, Switzerland

[21] Appl. No.: 138,441

[22] Filed: Apr. 8, 1980

[30] Foreign Application Priority Data

Apr. 17, 1979 [CH] Switzerland ............ 3618/79

[51] Int. Cl.³ .................................. B23B 13/08
[52] U.S. Cl. ....................... 82/38 A; 82/2.5; 414/17
[58] Field of Search ............ 82/38 A, 2.5, 2.7; 414/17, 18

[56] References Cited

U.S. PATENT DOCUMENTS

| Re. 29,905 | 2/1979 | Scheurer | 414/17 |
|---|---|---|---|
| 2,272,720 | 2/1942 | Mariotte | 414/17 |

FOREIGN PATENT DOCUMENTS

| 2908755 | 9/1979 | Fed. Rep. of Germany ..... 82/38 A |
|---|---|---|
| 2919780 | 11/1979 | Fed. Rep. of Germany ..... 82/38 A |
| 2130997 | 10/1972 | France . |
| 514381 | 12/1971 | Switzerland . |
| 593746 | 12/1977 | Switzerland . |
| 2000702 | 1/1979 | United Kingdom . |

Primary Examiner—Leonidas Vlachos
Attorney, Agent, or Firm—Holman & Stern

[57] ABSTRACT

In order to reduce the outflow at the front of active liquid bathing the bar stock in a hydraulic stock-guiding tube of feed apparatus for an automatic lathe, a nozzle part is disposed at the front end of the guide tube in which the piece of bar stock is rotating and advancing. The nozzle includes one or more passages, through which a protective fluid is ejected, opening out into the inside aperture of the nozzle in which the bar is rotating and disposed in an oblique direction pointing toward the rear, i.e., against the flow of active liquid toward the front. This arrangement contributes toward lessening leakage of active liquid and increasing the pressure thereof around the bar, this increase in pressure in turn reducing noise and vibration in the feed apparatus.

7 Claims, 2 Drawing Figures

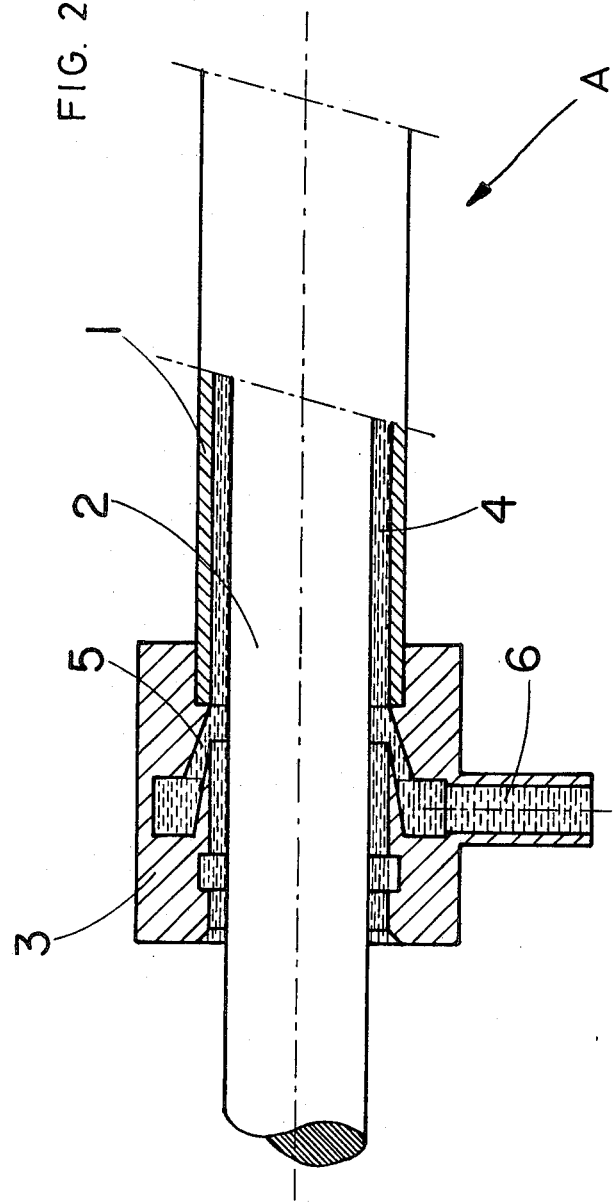

HYDRODYNAMIC INJECTION DEVICE FOR MACHINE TOOLS

This invention relates to feed apparatus for machine tools, and more particularly to a hydrodynamic injection device for hydraulic stock-guiding tubes of machine-tool feed apparatus, of the type intended to be disposed at the front of the tube.

Various tubes of apparatus for feeding bar stock to automatic lathes have been proposed. In particular, Swiss Pat. No. 514,381 teaches feed apparatus in which an oil-containing tube holds the bar stock to be machined and pushes it forward as necessary. This apparatus comprises a plurality of barrel-mounted tubes; but there is also single-tube apparatus such as that shown in FIG. 1 of the accompanying drawings, which illustrates this type of apparatus quite generally. This single- or multi-tube feed apparatus is situated at the rear of an automatic lathe, as may be seen in FIG. 1, for example; and a guide tube containing a piece of bar stock inserted in the headstock of the lathe is so disposed that its longitudinal axis coincides at least approximately with the axis of the headstock.

For some time now, guide tubes under hydraulic pressure have been used for feeding bar stock to automatic lathes performing turning operations. These guide tubes make use of the hydrodynamic bearing principle, using the guidance effect, due to the rotation of the bar stock, to keep the latter from being subjected to harmful friction against the inside of the tube whatever the cross-sectional shape of the bar stock, i.e., round, oval, square, or other. This arrangement prevents not only damaging wear, especially in the case of sectional bars, but also vibration and noise which it is increasingly sought to eliminate from workshops as far as possible.

Oil pressure is advantageously used to advance a piston pushing the bar stock when necessary. Such designs are described in various patent specifications, including the aforementioned Swiss Pat. No. 514,381, as well as U.S. Reissue Pat. No. RE 29,905 and Swiss Pat. No. 593,746 which disclose improvements in the stock-pusher piston design or in other structural or functional aspects.

In the above-mentioned apparatus, the active fluid (generally oil) necessary for obtaining the hydrodynamic effect is supplied from the rear of the guide tube, passing around the piston or into a special channel provided in the piston. The active fluid may also be injected all along the guide tube through spaced injection ports in the wall of the tube.

It has turned out in practice, however, that the prior art apparatus exhibits the shortcoming of allowing the active fluid to flow out too easily at the front of the guide tube. A certain amount of the active fluid will naturally always escape at the front, where it is collected in a suitable receptacle to be recycled; but it is disadvantageous to have too much active fluid escaping in this way, for this often causes insufficient or even scanty filling of the guide tube with fluid bathing the stock. As a result, there is an appreciable lessening of the hydrodynamic guidance phenomenon which it would, on the contrary, be desirable to exploit to the fullest in order to benefit by all its above-mentioned advantages, particularly under less favorable circumstances such as in the machining of square, triangular, or sectional stock.

It is an object of this invention to provide a hydrodynamic injection device for a hydraulic stock-guiding tube by means of which the aforementioned drawbacks of the prior art may be eliminated and which inhibits and reduces the outflow of active fluid at the front of the tube so that the tube is more completely filled and maximum benefit is derived from the advantages of the hydrodynamic guidance phenomenon, it being understood that the device must in no way interfere with the rotation or advance of the bar stock to be machined.

To this end, the hydrodynamic injection device according to the present invention comprises an annular nozzle through which the bar fed by the guide tube passes, this nozzle including at least one liquid-ejection passage disposed at an angle to the longitudinal axis of the nozzle and opening out on the inside surface thereof in such a way as to eject protective fluid against the stream relative to the movement of the active fluid bathing the bar in the tube and tending to escape at the front, this ejection against the stream opposing the movement of the active fluid to leave the tube by creating an overpressure zone in the front part of the tube.

The nozzle may comprise either a single annular ejection passage or several annularly distributed ducts. In the latter case, the ducts are preferably also disposed at an angle to the axial plane on which they open out, so as to impart a rotary motion to the fluid ejected.

The protective fluid ejected by the nozzle may advantageously be the same as the active fluid, and it may conveniently be drawn from a general hydraulic circuit of the machine.

A preferred embodiment of the invention will now be described in detail with reference to the accompanying drawing, in which:

FIG. 1 is a purely general diagrammatic elevation of a stock-guiding tube installed at the rear of an automatic lathe, illustrating the type of installation for which the present invention is intended, and FIG. 2 is a detail view, partially in section and on a greatly enlarged scale, of the part of FIG. 1 encircled by a dot-dash line and designated A, illustrating more particularly the subject-matter of the invention.

At the left of FIG. 1 appears an automatic lathe of a type known per se and requiring no further description. At the rear of this automatic lathe, in line with the axis of the headstock, there is a bar stock guide tube 1 containing a bar 2 of material to be machined, inserted in the headstock. It will be noted that the feed apparatus shown in FIG. 1 might easily be of the barrel type, comprising a plurality of guide tubes which can be interchangeably brought into alignment with the headstock by rotation of the barrel formed by this plurality of tubes.

FIG. 2, which reproduces only the detail A portion of FIG. 1, shows a unit 3 forming an injection nozzle disposed on the front end of guide tube 1 in which bar 2 rotates. An active liquid 4 bathes bar 2 and should, in order to ensure the advantageous effect of hydrodynamic guidance of bar 2 to the maximum, fill the entire space between bar 2 and the inside wall of tube 1. It will be seen in FIG. 2 that this requirement—not satisfied in prior art apparatus—is actually met owing to the favorable action of nozzle arrangement 3.

Active liquid 4 will usually have been admitted between bar 2 and tube 1 in a conventional manner, e.g., at the rear, but it is the functioning of nozzle 3 which causes liquid 4 to fill the space around bar 2 completely.

It will be noted that because of the rotation of bar 2, the active fluid 4—generally oil—surrounding bar 2 also begins to rotate, and this ensures the presence of liquid 4 in the upper part of tube 1 as well. However, toward the front of tube 1, complete filling thereof with liquid 4 is obtained only through means limiting the amount of this fluid which flows out of the tube.

In this instance, it will be seen that injection nozzle 3, which is responsible for such limitation, includes a passage 5 through which a protective fluid—usually but not necessarily the same as active liquid 4—is ejected in a direction at an angle to the longitudinal axis of tube 1, thus tending to cause active fluid 4 to flow back into tube 1. The protective fluid is therefore injected against the stream, as a countercurrent, and brakes the outflow of active liquid 4 at the front to a very large extent. In the drawing, nozzle unit 3 will be seen to comprise an annular chamber which receives the protective fluid via a pressurized-fluid supply line 6, the fluid usually being oil. In the embodiment illustrated, ejection passage 5 is of frustoconical shape starting from the annular chamber. Thus, the mouth of passage 5 extends all the way around the inside surface of annular nozzle 3 through which bar 2 passes.

As a modification, there could be a plurality of passages in the form of small ducts coming from the annular chamber which receives the pressurized protective fluid, distributed along the whole circumference of the inside surface of nozzle 3 and naturally running obliquely in order to feed the protective fluid counter to the flow of the active liquid.

The protective fluid necessary for operation of nozzle 3, supplied through line 6, may be metered for an optimum rate of flow, e.g., by means of a valve (not shown). The protective fluid will most often be the same as the active liquid, e.g., usually oil, and may advantageously be drawn from a general hydraulic circuit of the machine tool.

By controlling the rate of flow of the protective fluid via a valve, great flexibility of operation is obtained since the necessary optimum rate of flow may vary within appreciable limits according to the size and shape of the cross-section of the bar stock within a tube of a given size. Means (not shown) are naturally provided for securing nozzle 3 to tube 1. Moreover, to facilitate manufacture, for instance, nozzle unit 3 might be made in several parts, although it is shown in one piece in FIG. 2.

When the nozzle includes a plurality of passages for ejecting protective fluid, opening out obliquely on the cylindrical inside surface of the nozzle, it is particularly advantageous to dispose them at an angle not only to the axis of the tube and the nozzle but also to the axial plane of the nozzle on which they open out; by means of this arrangement, as soon as the protective fluid enters the space surrounding the bar it causes a rotary motion which is beneficial because it increases the effect of turbulence sought for the purpose of ensuring the best hydrodynamic guidance.

It will be noted as well that the nozzle for ejecting protective fluid against the stream tends to increase the pressure of the active liquid around the bar within the tube, i.e., in front of the piston which pushes the bar stock from behind. In apparatus not equipped with a device such as the countercurrent injection nozzle, the pressure, which is considerable behind the piston in order to cause it to advance, is very low in front of the piston, around the bar; because of the virtually free outflow at the front in prior art apparatus, this pressure will hardly exceed atmospheric pressure except for some possible turbulence caused by rotation of the bar stock. With the ejection nozzle according to the present invention, however, this oil pressure around the bar increases, thus contributing to an even greater extent toward lessening the noise and vibration which have been among the most serious drawbacks of prior art feed apparatus, particularly of dryrunning apparatus.

The nozzle might also be made in one piece with the tube, or the passages might even be made in the tube itself, with simply a sleeve around the tube at the desired location for supplying the protective fluid.

What is claimed is:

1. In a device comprising a hydraulic stock-guiding tube containing a first liquid and forming part of a machine-tool feed apparatus having a general hydraulic circuit, the improvement comprising:
    a hydrodynamic injection means disposed at the output end of the stock-guiding tube, comprising an annular nozzle adapted to encircle a piece of bar stock, said nozzle including at least one fluid ejection passage disposed at an angle to the longitudinal axis of said annular nozzle and opening out on the inside surface thereof in a direction opposite to the direction of flow of the first liquid, so that a fluid flowing out of said nozzle flows in a direction opposite to the flow of the first liquid and thereby creates an overpressure zone in the output end of the stock-guiding tube.

2. The improvement of claim 1, wherein said nozzle includes a single, annular fluid ejection passage.

3. The improvement of claim 1, wherein said nozzle includes a plurality of fluid ejection passages distributed annularly about said inside surface.

4. The improvement of claim 3, wherein said ejection passages are further disposed at an angle to the axial plane of said nozzle on which said passages open out for imparting rotary motion to said fluid when ejected.

5. The improvement of claim 1, wherein said fluid is a second liquid.

6. The improvement of claim 5, wherein said first and second liquids are oil.

7. The improvement of claim 2, 3, 4, or 1 wherein the first liquid and the fluid are both oil and are drawn from the general hydraulic circuit.

* * * * *